United States Patent
Floyd

(10) Patent No.: US 8,441,307 B2
(45) Date of Patent: May 14, 2013

(54) METHODS AND CIRCUITS FOR A LOW INPUT VOLTAGE CHARGE PUMP

(75) Inventor: Brian Harold Floyd, Sunnyvale, CA (US)

(73) Assignee: Aptus Power Semiconductor, Los Altos, CA (US)

( * ) Notice: Subject to any disclaimer, the term of this patent is extended or adjusted under 35 U.S.C. 154(b) by 296 days.

(21) Appl. No.: 12/854,777

(22) Filed: Aug. 11, 2010

(65) Prior Publication Data

US 2011/0050328 A1     Mar. 3, 2011

Related U.S. Application Data

(60) Provisional application No. 61/238,884, filed on Sep. 1, 2009.

(51) Int. Cl.
*G05F 1/10*     (2006.01)

(52) U.S. Cl.
USPC ............................................. 327/536; 363/60

(58) Field of Classification Search .................. 327/536, 327/537; 363/59–60
See application file for complete search history.

(56) References Cited

U.S. PATENT DOCUMENTS

| | | | |
|---|---|---|---|
| 5,874,850 A | 2/1999 | Pulvirenti et al. | |
| 6,198,340 B1 * | 3/2001 | Ting et al. | 327/536 |
| 6,404,271 B2 * | 6/2002 | Ayres | 327/536 |
| 6,870,229 B2 * | 3/2005 | Dessard et al. | 257/360 |
| 6,888,399 B2 * | 5/2005 | Nakagawa et al. | 327/536 |
| 6,909,319 B2 * | 6/2005 | Wang et al. | 327/536 |
| 7,002,399 B2 * | 2/2006 | Nuzzarello et al. | 327/536 |
| 7,432,757 B2 * | 10/2008 | Kimura | 327/537 |
| 7,495,500 B2 * | 2/2009 | Al-Shamma et al. | 327/536 |
| 7,595,683 B1 | 9/2009 | Floyd | |
| 8,076,968 B1 * | 12/2011 | Floyd | 327/536 |
| 8,154,333 B2 * | 4/2012 | Ker et al. | 327/536 |
| 8,222,953 B2 * | 7/2012 | Nakamura | 327/536 |
| 2005/0146375 A1 * | 7/2005 | Ker et al. | 327/536 |
| 2010/0283533 A1 * | 11/2010 | Li | 327/536 |

* cited by examiner

*Primary Examiner* — Thomas J Hiltunen
(74) *Attorney, Agent, or Firm* — Venture Pacific Law, PC

(57) ABSTRACT

A charge pump circuit comprises a plurality of subcircuits, where the subcircuits are connected to each other in a single or a dual array having a repeating pattern. Each of the subcircuits comprises one or more of the following: an X-channel device having an X-gate terminal, an X-source terminal and an X-drain terminal, a Y-channel device having a Y-gate terminal, a Y-source terminal and a Y-drain terminal, and a capacitor; wherein a first end of the capacitor, the X-drain terminal, and the Y-drain terminal are connected with each other to form the common drain terminal; and wherein a second end of the capacitor is the clock terminal.

20 Claims, 18 Drawing Sheets

US 8,441,307 B2

METHODS AND CIRCUITS FOR A LOW INPUT VOLTAGE CHARGE PUMP

CROSS REFERENCE

This application claims priority from a provisional patent application entitled "Efficient low-input-voltage charge-pump switch-array circuit topologies" filed on Sep. 1, 2009 and having an Application No. 61/238,884. Said application is incorporated herein by reference.

FIELD OF INVENTION

This invention relates to methods and circuits for a charge pump and, in particular, to methods and circuits for a low input voltage charge pump having a switch array circuit topology.

BACKGROUND

Typically, charge pumps use a switching process to provide an output voltage that has a larger magnitude than an input voltage. Charge pumps are used in many contexts, e.g., in integrated circuits, peripheral circuits on flash memory, and other circuits, for generating the needed operating voltages from a lower supply voltage.

A number of charge pump designs, such as conventional Dickson-type charge pumps, are known in the art. FIG. 1 illustrates a typical four-stage Dickson charge pump device. The Dickson charge pump comprises diodes D1-D5 connected in series with coupling capacitors C1-C4, where each capacitor is connected to a node between the diodes D1-D5. The Dickson charge pump circuit also includes an output capacitor Cout. The input clock pulses, a ClkA and a ClkB, are out of phase with respect to each other, where the ClkA is applied to the capacitors C1 and C3, and the ClkB is applied to the capacitors C2 and C4. As can be appreciated by persons of ordinary skill in the art, each clock pulse with drive the output voltage by a multiplier of the input voltage.

If the input voltage for the charge pump is particularly low (e.g., 1V or lower), the charge pump, according to previous designs known in the art, would either fail to provide the requisite driving voltage due to switch conduction loss or alternately require a complex structure. Thus, providing charge pump circuits that would have minimal drain (as small as possible) on the power supply for their operation is of significant importance. The present trend toward ever lower supply voltages for integrated circuits can only increase this importance.

Therefore, it is important to provide new methods and circuits for a charge pump which can operate with input voltages as low as 1V or less.

SUMMARY OF INVENTION

An object of this invention is to provide methods and circuits for a charge pump that is operated by a low input voltage.

Another object of this invention is to provide methods and circuits for a charge pump that reduce switch conduction loss.

Yet another object of this invention is to provide methods and circuits for a charge pump that enhance gate driving using a switch array circuit topology.

Briefly, the present invention discloses charge pump circuits, comprising a plurality of subcircuits, where the subcircuits are connected to each other in a single or a dual array having a designed pattern. Each of the subcircuits comprises one or more of the following: an X-channel device having an X-gate terminal, an X-source terminal and an X-drain terminal, a Y-channel device having a Y-gate terminal, a Y-source terminal and a Y-drain terminal, and a capacitor; wherein a first end of the capacitor, the X-drain terminal, and the Y-drain terminal are connected with each other to form the common drain terminal; and wherein a second end of the capacitor is the clock terminal.

An advantage of this invention is that methods and circuits for a charge pump are provided, where the charge pump is operated by a low input voltage.

Another advantage of this invention is that methods and circuits for a charge pump are provided that reduce switch conduction loss.

Yet another object of this invention is that methods and circuits for a charge pump are provided that enhance gate drive using a switch array circuit topology.

DESCRIPTION OF THE DRAWINGS

The foregoing and other objects, aspects, and advantages of the invention can be better understood from the following detailed description of the preferred embodiment of the invention when taken in conjunction with the accompanying drawings in which.

DETAILED DESCRIPTION OF THE PREFERRED EMBODIMENTS

It is to be understood that the following circuit description and the figures are understood by a person having ordinary skill in the art, who designs integrated circuits using commonly practiced techniques, including hierarchical circuit design with schematic-entry tools.

Figure 1:
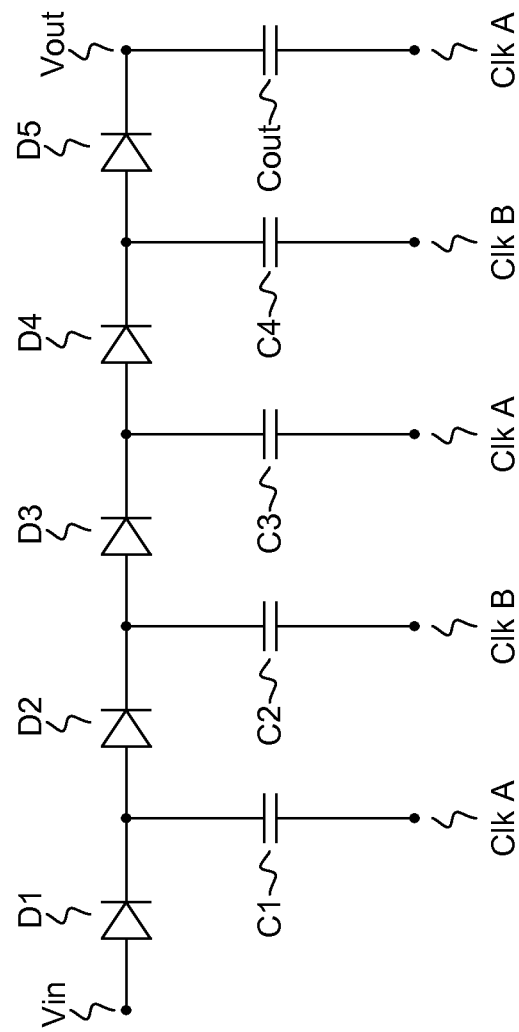
FIG. 1 illustrates a Dickson charge pump of the prior art.
Figure 2A:
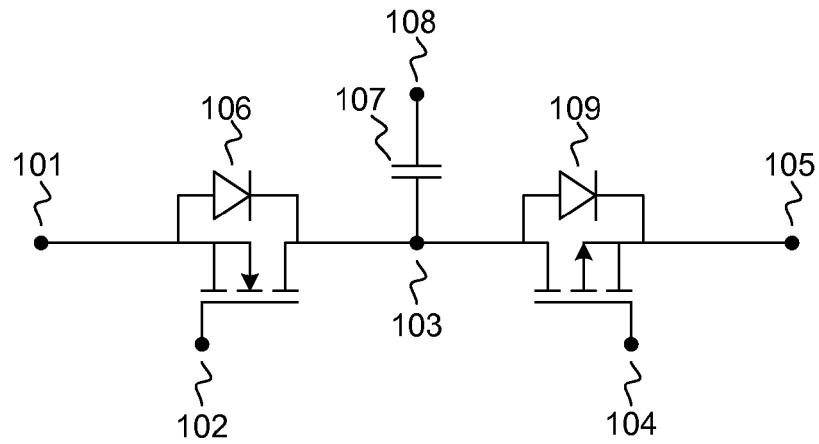
FIG. 2a illustrates a subcircuit of a charge pump of the present invention, where the subcircuit comprises an NMOS transistor, a PMOS transistor, and a pump capacitor C.

FIG. 2a illustrates a subcircuit of a charge pump of the present invention. The subcircuit, herein referred to as subcircuit T, comprises an NMOS transistor 106, a PMOS transistor 109, and a capacitor 107. The source 101 of the NMOS transistor 106 is given port reference NS. It can be understood from the figure that the body of the NMOS transistor 106 is directly connected to its source 101. The gate 102 of the NMOS transistor 106 is given port reference NG. The source 105 of the PMOS transistor 109 is given port reference PS. It is understood from the diagram that the body of the PMOS transistor 109 is directly connected to its source 105. The gate 104 of the PMOS transistor 109 is given port reference PG. The drain of the PMOS transistor 109 and the drain of the NMOS transistor 106 are connected to one port 103 of capacitor 107 at port reference D. The other port 108 of capacitor 107 is connected to a port reference CLK. The ports, as labeled, define a subcircuit T. In alternative embodiments of the invention, the transistors in the subcircuit T can have their respective bodies connected to a fixed global body potential (e.g., a fixed voltage).

Figure 2B:
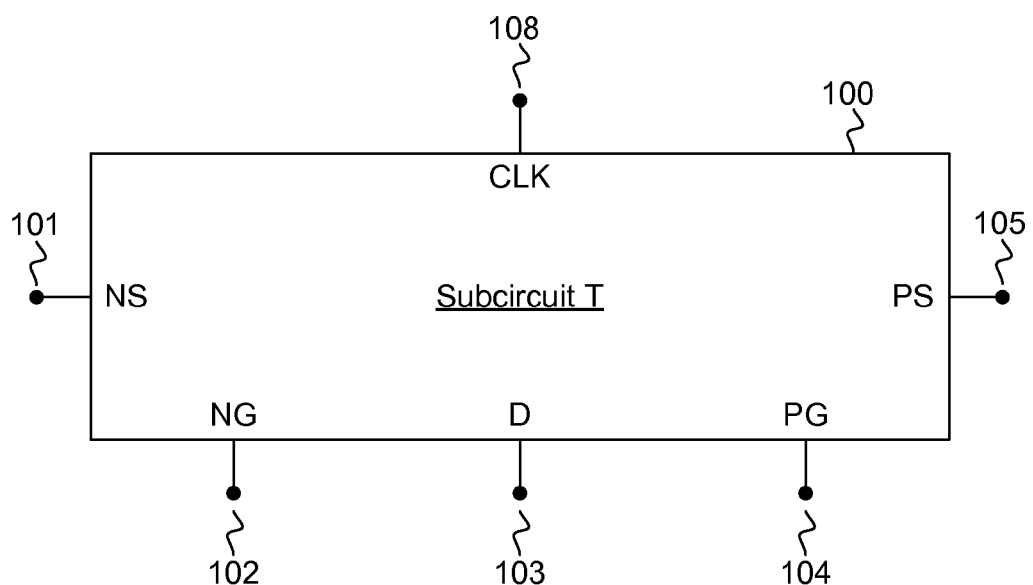
FIG. 2b illustrates a hierarchical block representation of a subcircuit T.

FIG. 2b illustrates a hierarchical block representation of the subcircuit T. The subcircuit T hierarchical block 100 is equivalent to the circuit diagram from FIG. 2a. As defined above, the gate ports are NG at node 102 and PG at node 104. The clock port is CLK at node 108. The source ports are NS at node 101 and PS at node 105. The drain port is D at node 103. Isolation nodes and methodologies are not drawn in the hierarchical block 100 since it is understood by persons having ordinary skill in the art, e.g., those who follow commonly practiced integrated circuit design techniques.

Figure 3A:
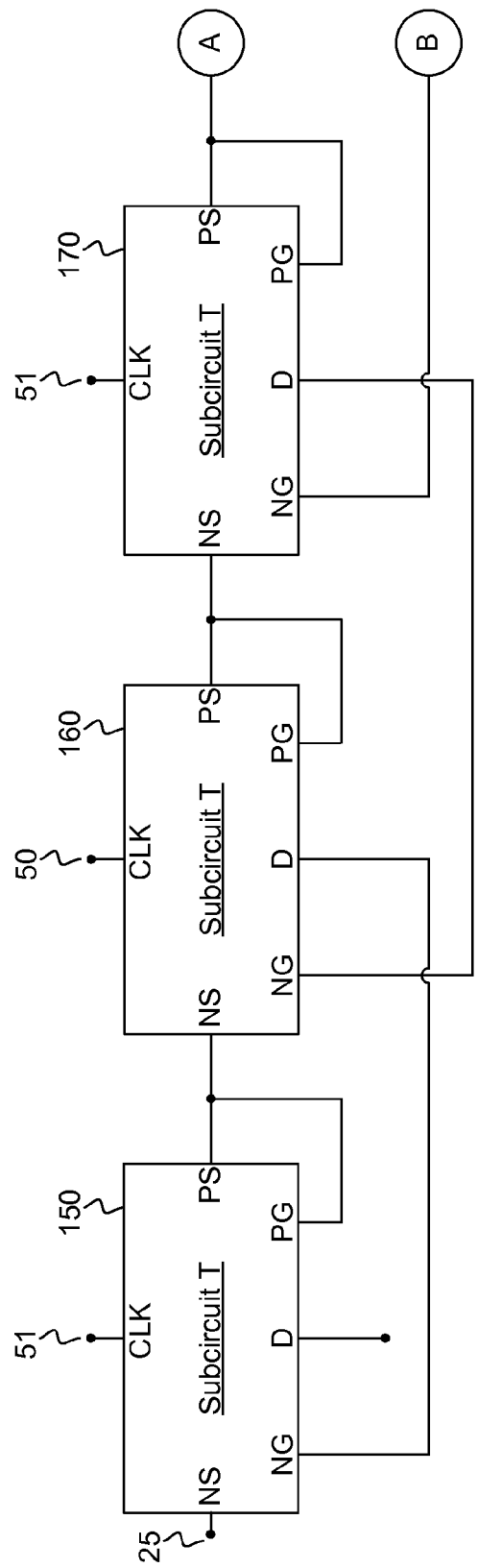
FIGS. 3a-3b illustrate an embodiment of the present invention for a charge pump having a single array of subcircuit T's.
Figure 3B:
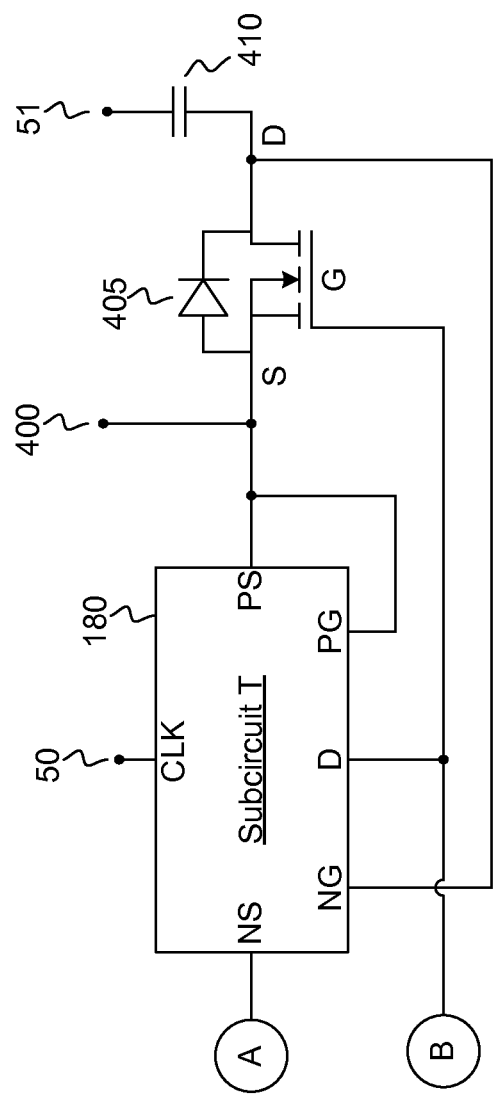

FIGS. 3a-3b illustrate an embodiment of the present invention for a charge pump, where subcircuit T's are cascaded in a single array to create a charge pump. Several stages of the subcircuit T's are illustrated from left to right. The first stage subcircuit T 150 is the left most stage. A voltage VA is at the NS port 25 of subcircuit T 150. The voltage VA can be an output voltage or an input voltage depending upon the type of charge pump operation, i.e., either a negative charge pump or a positive charge pump. The subcircuit T 150's D port remains unconnected, and its CLK port is connected to clock signal 51. The gating port NG of subcircuit T 150 is connected to the D port of a next subcircuit T 160. The gating port PG and port PS of subcircuit T 150 are both connected to the NS port of subcircuit T 160.

The second stage subcircuit T 160 receives clock signal 50 at its CLK port. The gating port NG of subcircuit T 160 is connected to the D port of a next subcircuit T 170. The gating port PG and port PS of subcircuit T 160 are both connected to the NS port of subcircuit T 170. The third stage subcircuit T 170 receives clock signal 51 at its CLK port.

The third stage subcircuit T 170 represents an intermediate stage, and its gating port NG can be connected to a D port of a next subcircuit T stage (illustrated in FIG. 3b). Similarly, subcircuit T 170's PG and PS ports both connect together to the next subcircuit T's NS port. This can be a repeating pattern. Based upon simulation or calculation, the number of stages of subcircuit T's can be selected to meet specific design requirements. A circuit designer can understand from this diagram the repeating pattern and how clock signals 50 and 51 are applied to drive the charge pump. For instance, if clock signal 50 is applied to the first stage, then it must be applied to the first, third, fifth, and so-on in the odd numbered stages of the array. Alternatively, if clock signal 51 is applied to the first even numbered stage, then it must be applied to all the even numbered stages of the array.

FIG. 3b illustrates a method to complete the cascade of subcircuit T's. The previous ports NG, PG, and PS, from subcircuit T 170 in FIG. 3a can be connected to subcircuit T 180 in FIG. 3b. The previous NG port of subcircuit T 170 connects to the D port of subcircuit T 180. The previous PG and PS ports of subcircuit 170 connect to the NS port of subcircuit T 180. Subcircuit T 180 receives clock signal 50 at its CLK port since the previous stage receives clock signal 51. In this illustration, this fourth stage is the right-most or last stage of the cascade. An NMOS transistor 405 must also be connected to complete the charge pump. The PG and PS ports of subcircuit T 180 both connect to the source of the NMOS transistor 405.

It is understood that the source of the NMOS transistor 405 is also connected to its body. Alternatively, the transistors in the charge pump can have their respective bodies connected to a fixed global body potential (e.g., a fixed voltage). It should also be understood that isolation nodes or isolation techniques are not drawn but should be obvious to a person having average skill in the integrated-circuit design field. The drain of the NMOS transistor 405 is connected both to the NG port of subcircuit T 180 and to one port of capacitor 410. The gate of the NMOS transistor 405 is connected to the D port of subcircuit T 180. The other port of capacitor 410 is connected to the opposite-phased clock 51 with the understanding that subcircuit T 180 and capacitor 410 must not receive the same clock signal. In other words, the capacitor 410 can receive clock signal 51 if the subcircuit T receives clock signal 50 at its CLK port, and vice versa.

The voltage VB at node 400 can be an output voltage or an input voltage depending upon the type of charge pump operation, i.e., a negative charge pump or a positive charge pump. Node 400 having the voltage VB is the illustrated connection at port PS of subcircuit T 180.

Figure 4:
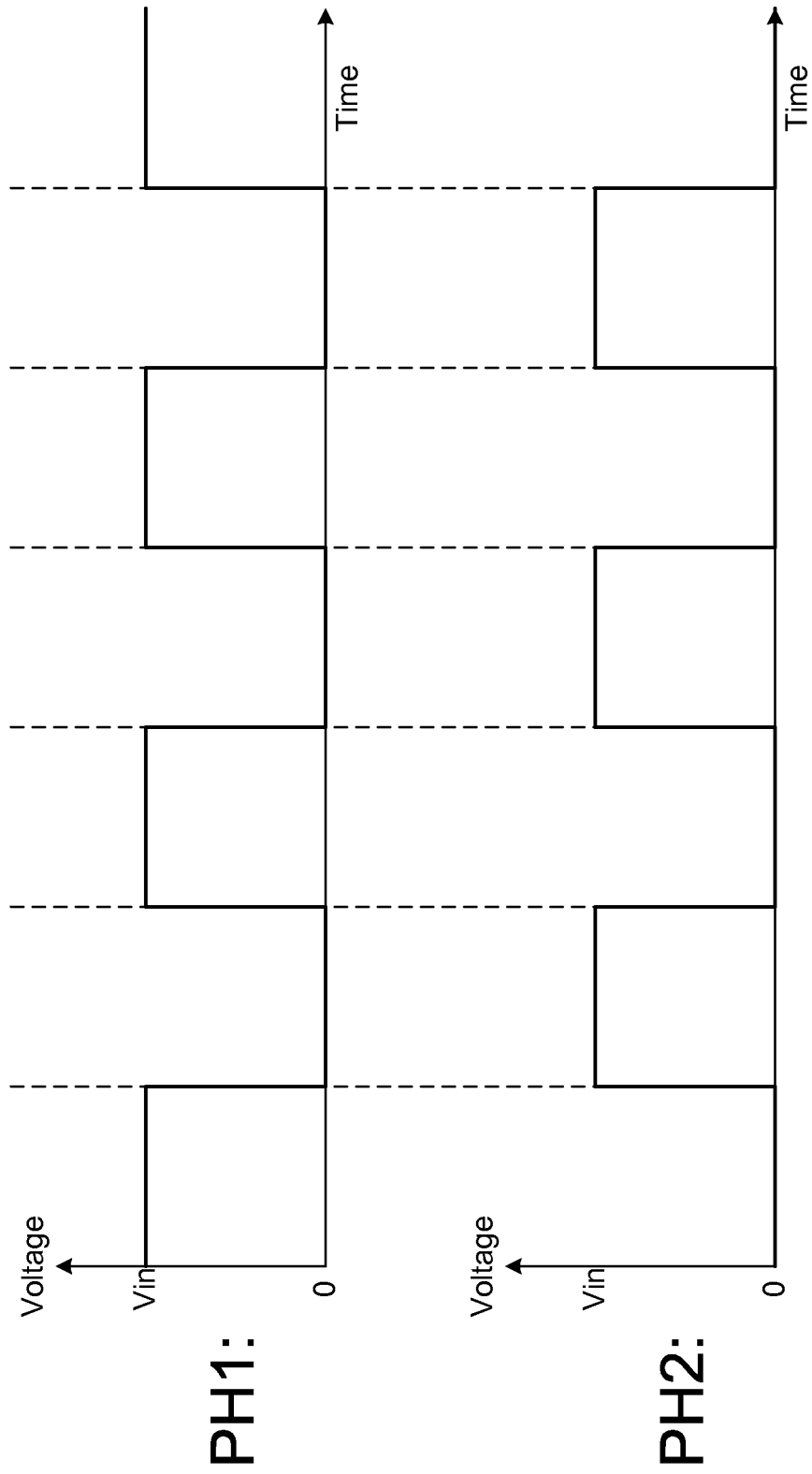
FIG. 4 illustrates clock waveforms for clock signals, labeled PH1 and PH2, of a charge pump of the present invention.

FIG. 4 illustrates clock waveforms for clock signals 50 and 51, labeled PH1 and PH2, of a charge pump of the present invention. The signal PH1 can correspond to clock signal 50 and the signal PH2 can correspond to clock signal 51. The clock signals can be periodic square-wave signals, which are in practice designed to be non-overlapping clock square waves of amplitude value, Vin. These clock signals connect to the pump capacitors as explained in the prior descriptions and as can be further demonstrated in the following descriptions.

Figure 5A:
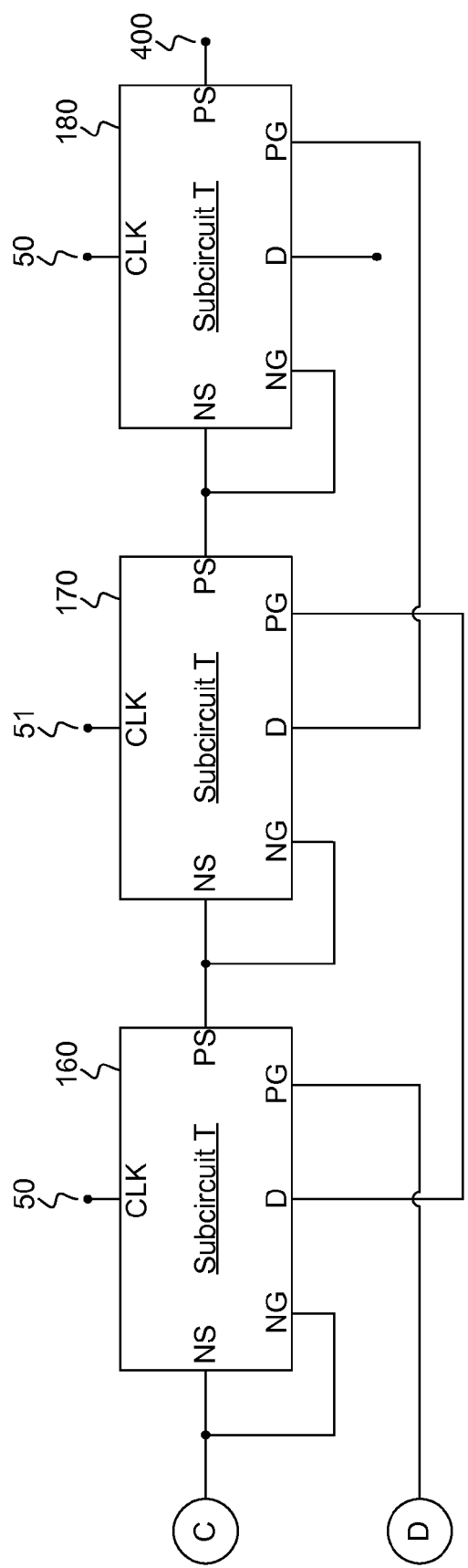
FIGS. 5a-5b illustrate another embodiment of the present invention for a charge pump having a single array of subcircuit T's.
Figure 5B:
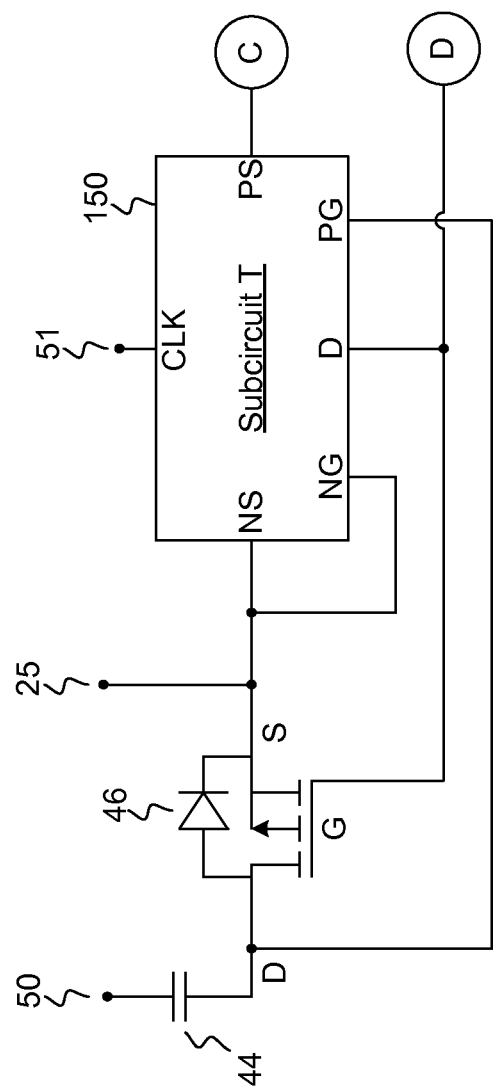

FIGS. 5a-5b illustrate another embodiment of the present invention for a charge pump having a single array of subcircuit T's. Several stages of the subcircuit T's are illustrated from left to right. The stage subcircuit T 180 is the right-most stage. A voltage VB at node 400 is connected at the PS port of subcircuit T 180. The voltage VB at node 400 can be an output or an input voltage depending upon the type of charge pump operation, i.e., a negative charge pump or a positive charge pump. The D port of the subcircuit T 180 remains unconnected. The CLK port of the subcircuit T 180 is connected to clock signal 50. The gating port PG of subcircuit T 180 is connected to the D port of a preceding subcircuit T 170. The gating port NG and port NS of subcircuit T 180 are both connected to the PS port of subcircuit T 170.

The middle stage subcircuit T 170 receives clock signal 51 at its CLK port. The gating port PG of subcircuit T 170 is connected to the D port of a preceding subcircuit T 160. The gating port NG and port NS of subcircuit T 170 are both connected to the PS port of subcircuit T 160. The subcircuit T 160 receives clock signal PHI 50 at its CLK port. The subcircuit T 160 represents an intermediate stage, and its gating port PG can connect to a D port of a preceding subcircuit T 150 stage. Similarly NG and NS ports of the subcircuit T 160 both connect together to the PS node of the preceding subcircuit T 150.

The connections of the array of subcircuit T's repeat in the designed pattern. Based upon simulation, calculation or other criterion, the number of stages of subcircuit T's can be selected to meet specific design requirements. A person having ordinary skill in circuit design can appreciate from this diagram the designed pattern and how clock signals 50 and 51 are applied. For instance, if clock signal 50 is applied to the first stage, then it must be applied to the first, third, fifth, and so-on odd stages in the array. Alternatively, if clock signal 51 is applied to the first even stage, then it must be applied to all even stages in the array.

FIG. 5b illustrates a method to complete the cascade of subcircuit T's in FIG. 5a. The previous ports PG, G, and NS from subcircuit T 160 of FIG. 5a can be connected to subcircuit T 150 in FIG. 5b. The PG port of subcircuit T 160 connects to the D port of subcircuit T 150. The NG and NS ports of subcircuit T 160 are both connected to the PS port of subcircuit T 150. The subcircuit T 150 receives clock signal 51 at its CLK port. This stage is the left-most or first stage of the cascade and a PMOS transistor 46 can also be connected to complete the charge pump. The NG and NS ports of subcircuit T 150 both connect to the source of the PMOS transistor 46.

It is understood that the source of the PMOS transistor 46 is also connected to its body. Alternatively, the transistors in the charge pump can have their respective bodies connected to a fixed global body potential (e.g., a fixed voltage). It should also be understood that isolation nodes or isolation techniques are not drawn, but should be obvious to a person having average skill in the integrated-circuit design field. The drain of the PMOS transistor 46 is connected to both the PG port of subcircuit T 150 and to one port of capacitor 44. The gate of the PMOS transistor 46 is connected to the D port of subcircuit T 150. The other port of capacitor 44 is connected to the opposite-phased clock 50 with the understanding that subcircuit T 150 and the capacitor 44 do not receive the same clock signal. In other words, the capacitor 44 receives clock signal 50 if subcircuit T 150 receives clock signal 51 at its respective CLK port; and vice versa.

The voltage VA at node 25 can be an output or an input voltage depending upon the type of charge pump operation, i.e., negative or positive charge pump. Node 25 having the voltage VA is the illustrated connection at port NS of subcircuit T 150.

Figure 6:
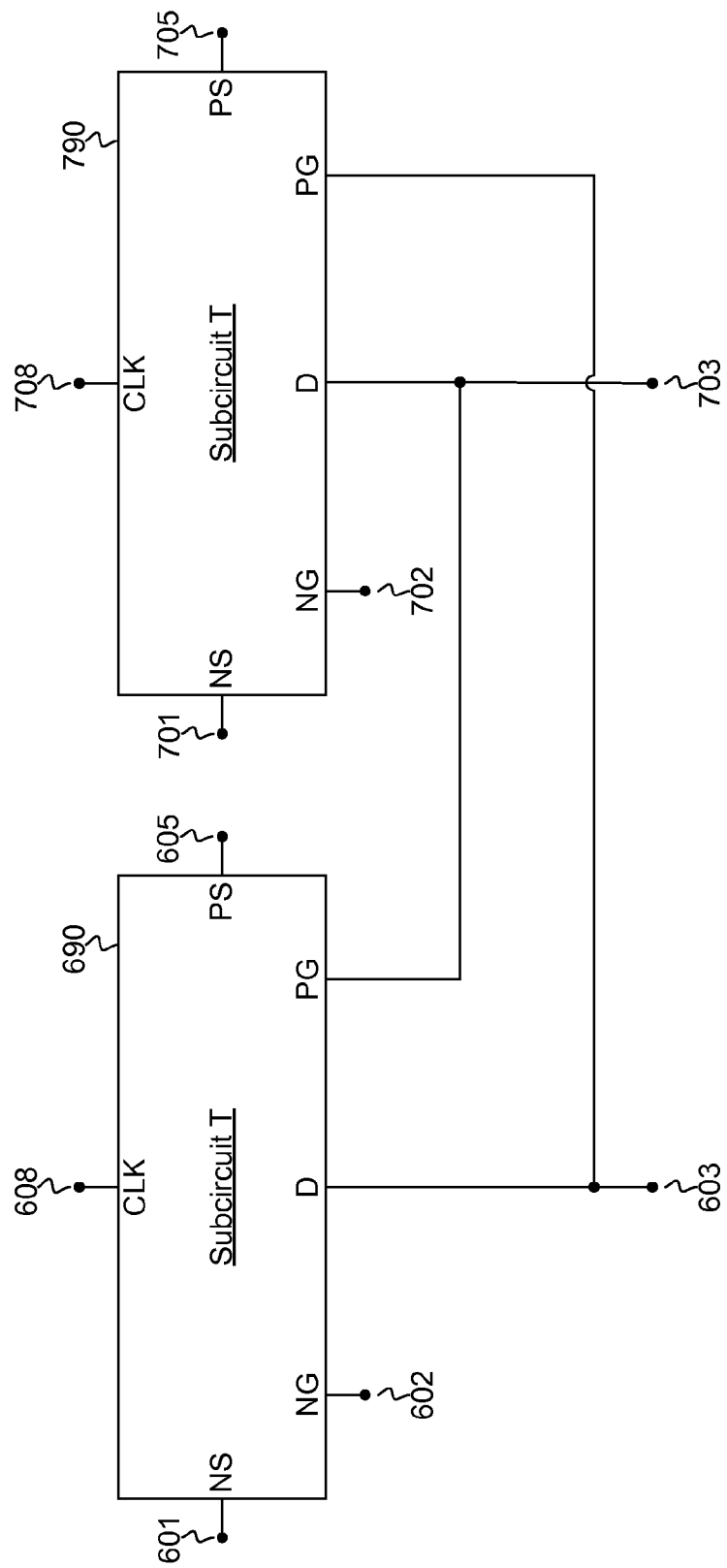
FIG. 6 illustrates an interconnection of two subcircuit T's to form a block circuit, herein referred to as subcircuit P.

FIG. 6 illustrates an interconnection of two subcircuit T's to form a block circuit, herein referred to as subcircuit P. The ports of subcircuit T 690 are referenced as follows: the NS port is given port reference NS1 at node 601; the NG port is given port reference NG1 at node 602; the D port is given port reference D1 at node 603; the PS port is given port reference PS1 at node 605; and the CLK port is given port reference CLKA at node 608. The ports of subcircuit T 790 are referenced as follows: the NS port is given port reference NS2 at node 701; the NG port is given port reference NG2 at node 702; the D port is given port reference D2 at node 703; the PS port is given port reference PS2 at node 705; and the CLK port is given port reference CLKB at node 708. The PG port of subcircuit T 690 connects directly to the D2 port of subcircuit T 790. Similarly, the PG port of subcircuit T 790 connects directly to the D1 port of subcircuit T 690.

Figure 7:
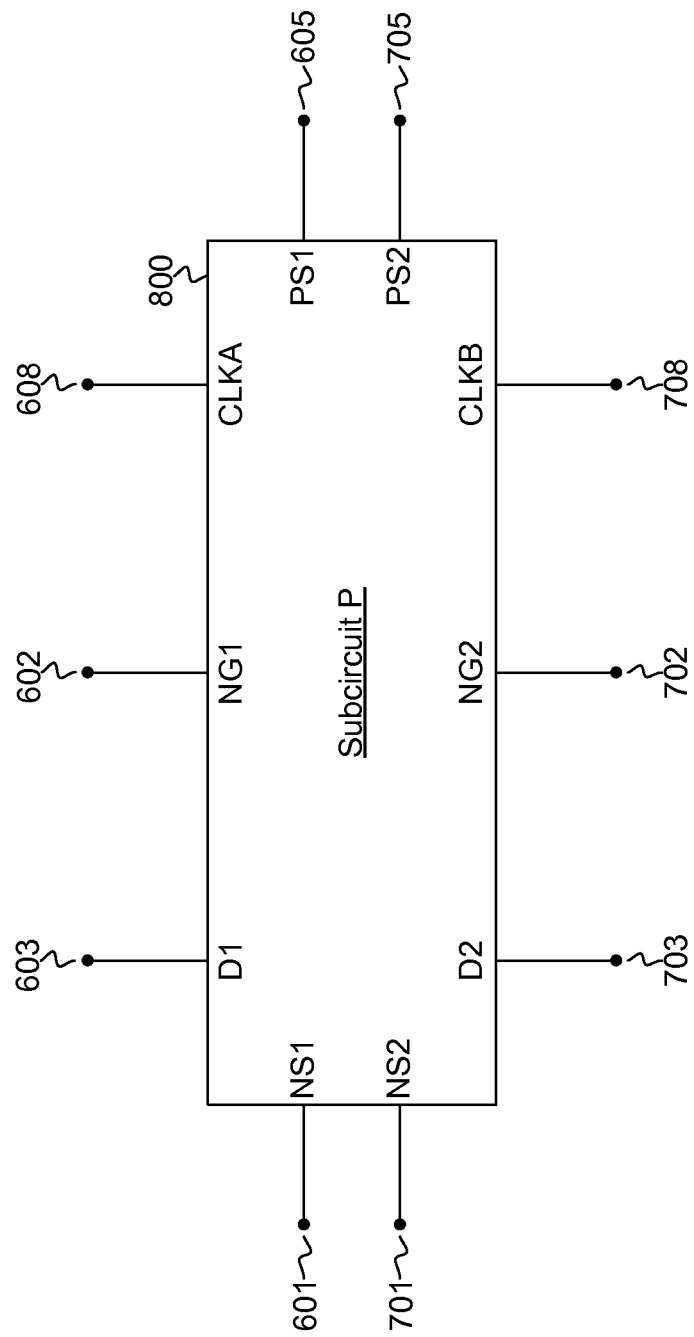
FIG. 7 illustrates a hierarchical block representation of a subcircuit P.

FIG. 7 illustrates a hierarchical block representation of a subcircuit P. The subcircuit P symbol 800 is equivalent to the circuit diagram of FIG. 6. The usage of the hierarchical block should be clear to a person have ordinary skill in circuit design and familiar with drawing a hierarchy of schematics. The ports of subcircuit P 800 correspond to the ports referenced in FIG. 6 and are summarized as follows: the gating ports are NG1 at node 602 and NG2 at node 702; the drain ports are D1 at node 603 and D2 at node 703; the clock-signal ports are CLKA at node 608 and CLKB at node 708; the left NMOS source ports are NS1 at node 601 and NS2 at node 701; and the right PMOS source ports are PS1 at node 605 and PS2 at node 705.

The hierarchical block representation of a subcircuit P can be used in generating hierarchical schematics. It is also understood that additional layout requirements, such as isolation wells with their respective isolation-node connections, are global. Isolation nodes and methodologies are not drawn in this hierarchical block since it is commonly understood by persons have ordinary skill in the art. There is a rule in connecting the CLKA and the CLKB ports: the CLKA and CLKB ports must receive opposite-phased (or out-of-phase) clocks. Thus, if a designer uses clock signals 50 and 51 and the CLKA port receives clock signal 50, then the CLKB port must receive clock signal 51. Alternatively, if the CLKA port receives clock signal 51, then the CLKB port must receive clock signal 50.

Figure 8A:
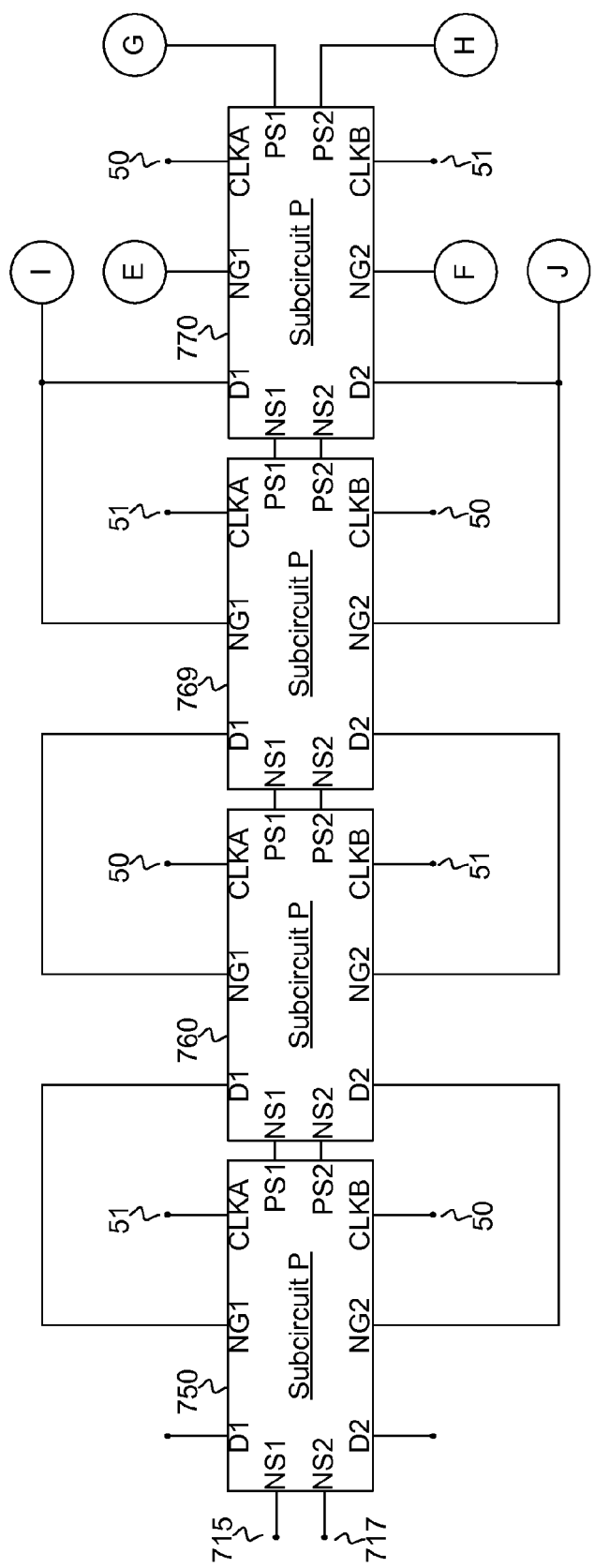
FIGS. 8a-8b illustrate another embodiment of the present invention for a dual array charge pump having multiple subcircuit P's.
Figure 8B:
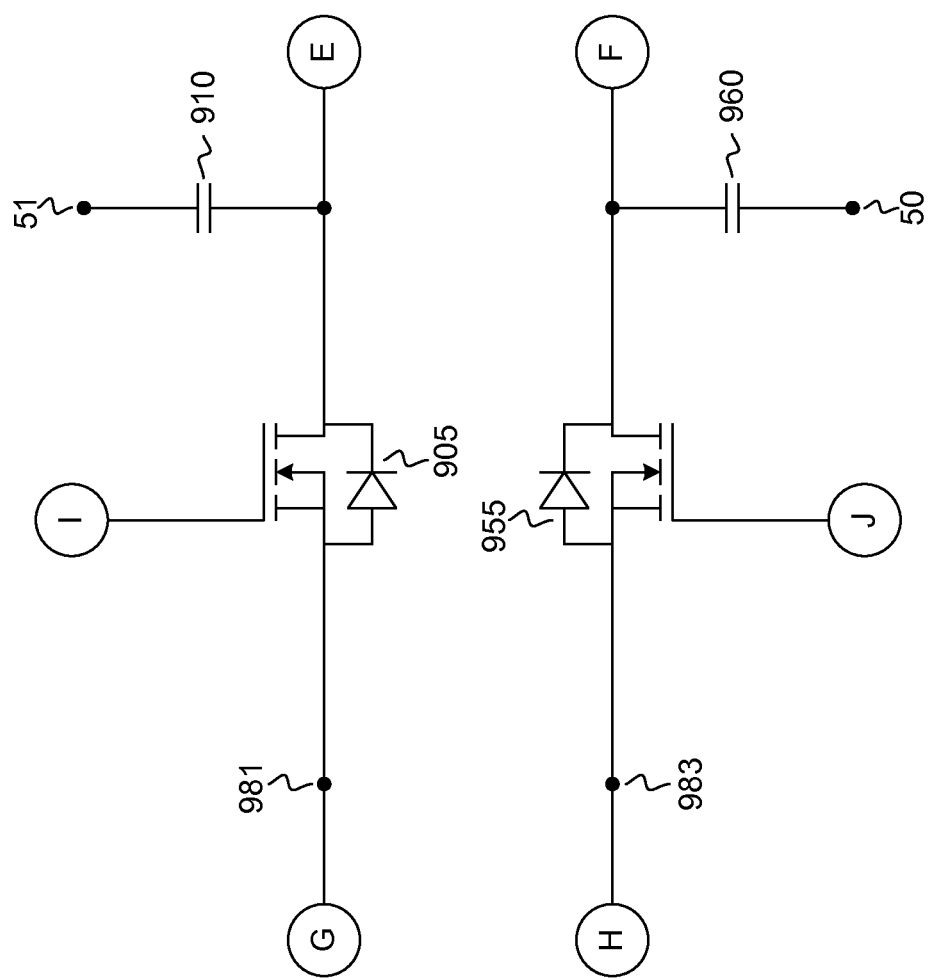

FIGS. 8a-8b illustrate another embodiment of the present invention for a dual array charge pump having an array of subcircuit P's. Various stages of subcircuit P's are placed from left to right. A first stage subcircuit P 750 is the left-most stage. A voltage VA1 is at the NS1 port of the subcircuit P 750 at node 715 and voltage VA2 is at the NS2 port of the subcircuit P 750 at node 717. The VA1 at node 715 and VA2 at node 717 can both be output voltages or input voltages depending upon the type of charge pump operation, i.e., a negative charge pump or positive charge pump.

The D1 and D2 ports of subcircuit P 750 remain unconnected. The CLKA port of subcircuit P 750 is connected to clock signal 51 and the CLKB port of subcircuit P 750 is connected to clock signal 50. The gating port NG1 of subcircuit P 750 is connected to the D1 port of a next subcircuit P 760, while the gating port NG2 of subcircuit P 750 is connected to the D2 port of the next subcircuit P 760. The PS1 port of subcircuit P 750 connects directly to the NS1 port of subcircuit P 760, while the PS2 port of subcircuit P 750 connects directly to the NS2 port of subcircuit P 760. The second stage subcircuit P 760 receives clock signal 50 at its CLKA port and clock signal 51 at its CLKB port.

This pattern is designed such that the gating ports NG1 and NG2 of subcircuit P 760 are connected to the D1 and D2 ports, respectively, of a next subcircuit P 769, while the PS1 and PS2 ports of subcircuit P 760 connect to the NS1 and NS2 ports, respectively, of the next subcircuit P 769.

This is a repeating pattern. Based upon simulation or calculation, the number of stages of subcircuit P can be selected to meet the specific design requirements. A person having ordinary skill in circuit design can appreciate from this diagram the repeating pattern and how clock signals 50 and 51 are applied, such that if one stage of subcircuit P receives clock signal 50 at its respective CLKA port, then the next successive stage of subcircuit P's must receive clock signal 51 at the next successive stage's respective CLKA port.

Thus, the subcircuit P 769 receives clock signal 51 at its CLKA port and clock signal 50 at its CLKB port. The ports NG1, NG2, PS1, and PS2, of subcircuit P 769 are connected to a subcircuit P 770. The NG1 and NG2 ports of subcircuit P 769 can be connected to the D1 and D2 ports, respectively, of subcircuit P 770. The PS1 and PS2 ports of the subcircuit P 769 can be connected directly to the NS1 and NS2 ports, respectively, of subcircuit P 770.

The subcircuit P 770 receives clock signals 50 and 51 at its CLKA and CLKB ports, respectively, according to the repeating requirements described earlier. This stage is the rightmost or last stage of the dual-array cascade and two NMOS transistors 905 and 955 are also connected to complete the charge pump. The PS1 node of subcircuit P 770 connects to the source of the NMOS transistor 905. It is understood that the source of the NMOS transistor 905 is also connected to its body. Alternatively, the transistors in the charge pump can have their respective bodies connected to a fixed global body potential (e.g., a fixed voltage). It should also be understood that isolation nodes or isolation techniques are not drawn but should be obvious to a person having ordinary skill in the integrated circuit design field.

The drain of NMOS transistor 905 drain is connected to both the NG1 port of subcircuit P 770 and to one port of capacitor 910. The NMOS transistor 905 gate is connected to the D1 port of subcircuit P 770. The other port of capacitor 910 is connected to the clock 51 with the understanding that the CLKA port of subcircuit P 770 and the capacitor 910 must not receive the same clock signal. The PS2 node of subcircuit P 770 connects to the NMOS transistor 955 source. It is understood that the NMOS transistor 955 source is also connected to its body. Alternatively, the transistors in the charge pump can have their respective bodies connected to a fixed global body potential (e.g., a fixed voltage). It should also be understood that isolation nodes or isolation techniques are not drawn but should be obvious to a person having ordinary skill in the integrated circuit design field.

The drain of the NMOS transistor 955 is connected both to the NG2 port of subcircuit P 770 and to one port of capacitor 960. The gate of the NMOS transistor 955 is connected to the D2 port of subcircuit P 770. The other port of capacitor 960 is connected to clock signal 50 with the understanding that the CLKB port of subcircuit P 770 and the capacitor 960 do not receive the same clock signal.

Voltages VB1 at node 981 and VB2 at node 983 are at the PS1 and PS2 ports of the subcircuit P 770, respectively. The voltages VB1 and VB2 can both be output voltages or both input voltages depending upon the type of charge pump operation, i.e., a negative charge pump or a positive charge pump.

Figure 9:
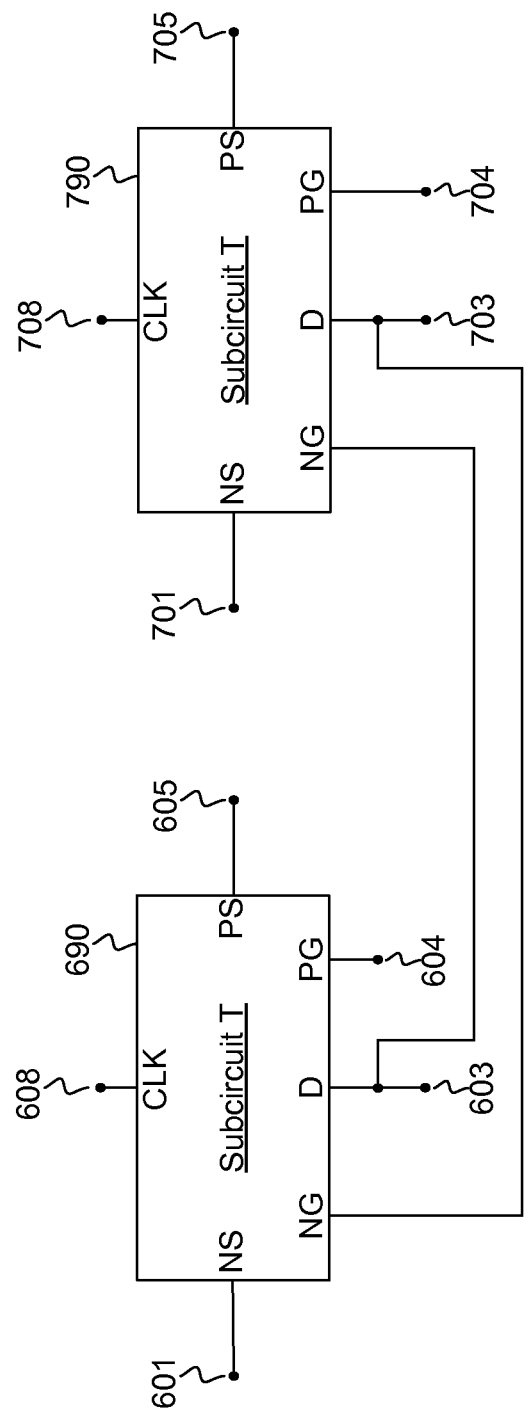
FIG. 9 illustrates an interconnection of two subcircuit T's to form a block circuit, herein referred to as subcircuit N.

FIG. 9 illustrates an interconnection of two subcircuit T's to form a block circuit, herein referred to as subcircuit N. The ports of subcircuit T 690 are referenced as follows: the NS port is given port reference NS1 at node 601; the PG port is given port reference PG1 at node 604; the D port is given port reference D1 at node 603; the PS port is given port reference PS1 at node 605; and the CLK port is given port reference CLKA at node 608.

The ports of subcircuit T 790 are referenced as follows: the NS port is given port reference NS2 at node 701; the PG port is given port reference PG2 at node 704; the D port is given port reference D2 at node 703; the PS port is given port reference PS2 at node 705; and the CLK port is given port reference CLKB at node 708. The NG port of subcircuit T 690 connects directly to the D2 port of subcircuit T 790. Similarly, the NG port of subcircuit T 790 connects directly to the D1 port of subcircuit T 690.

Figure 10:
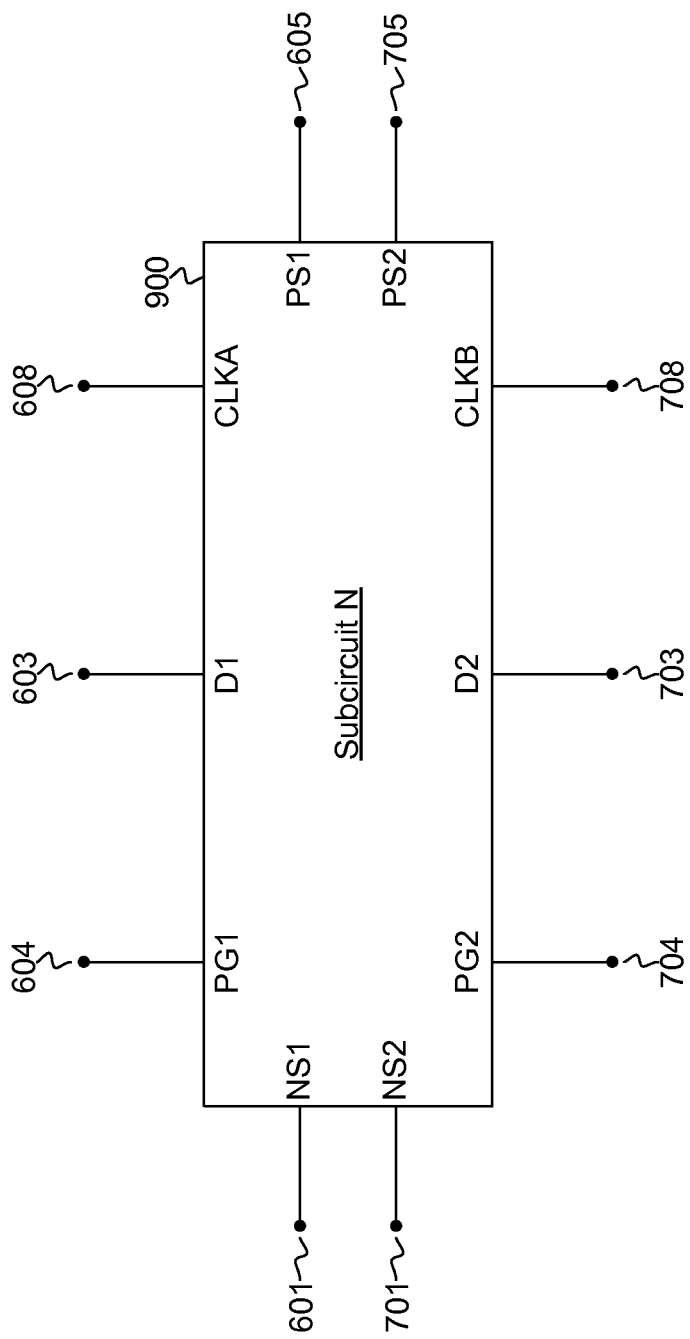
FIG. 10 illustrates a hierarchical block representation of a subcircuit N.

FIG. 10 illustrates a hierarchical block representation of the subcircuit N. The hierarchical block representation of subcircuit N is equivalent to the circuit diagram in FIG. 11. The hierarchical block's usage from the diagram should be clear to a person having ordinary skill in the circuit design field. The ports of subcircuit N 900 correspond to the ports referenced in FIG. 9 and are summarized as follows: the gating ports are PG1 and PG2; the drain ports are D1 and D2; the clock signal ports are CLKA and CLKB; the left NMOS source ports are NS1 and NS2; and the right PMOS source ports are PS1 and PS2. The hierarchical blocks can be used in generating hierarchical schematics. It would be understood that additional layout requirements, such as isolation wells with their respective isolation node connections, are global. Isolation nodes and methodologies are not drawn in the hierarchical block since it is understood by persons having ordinary skill in the art regarding integrated circuit design techniques.

There is a rule in connecting the CLKA and the CLKB ports: the CLKA and CLKB ports must receive opposite-phased (or out-of-phase) clocks. Thus, if clock signals 50 and 51 are used and the CLKA port receives clock signal 50, then the CLKB port must receive clock signal 51. Alternatively, if the CLKA port receives clock signal 51, then the CLKB port must receive clock signal 50.

Figure 11A:
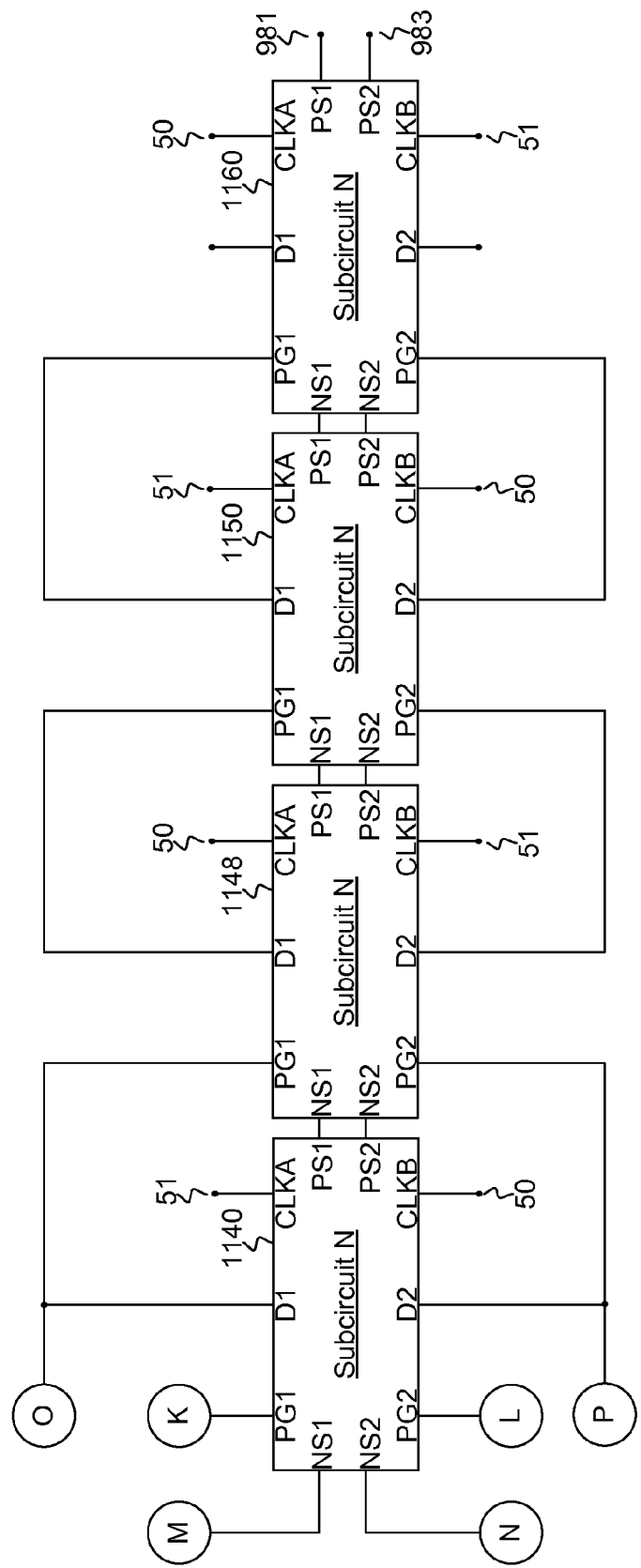
FIGS. 11a-11b illustrate another embodiment of the present invention for a dual array charge pump having multiple subcircuit N's.
Figure 11B:
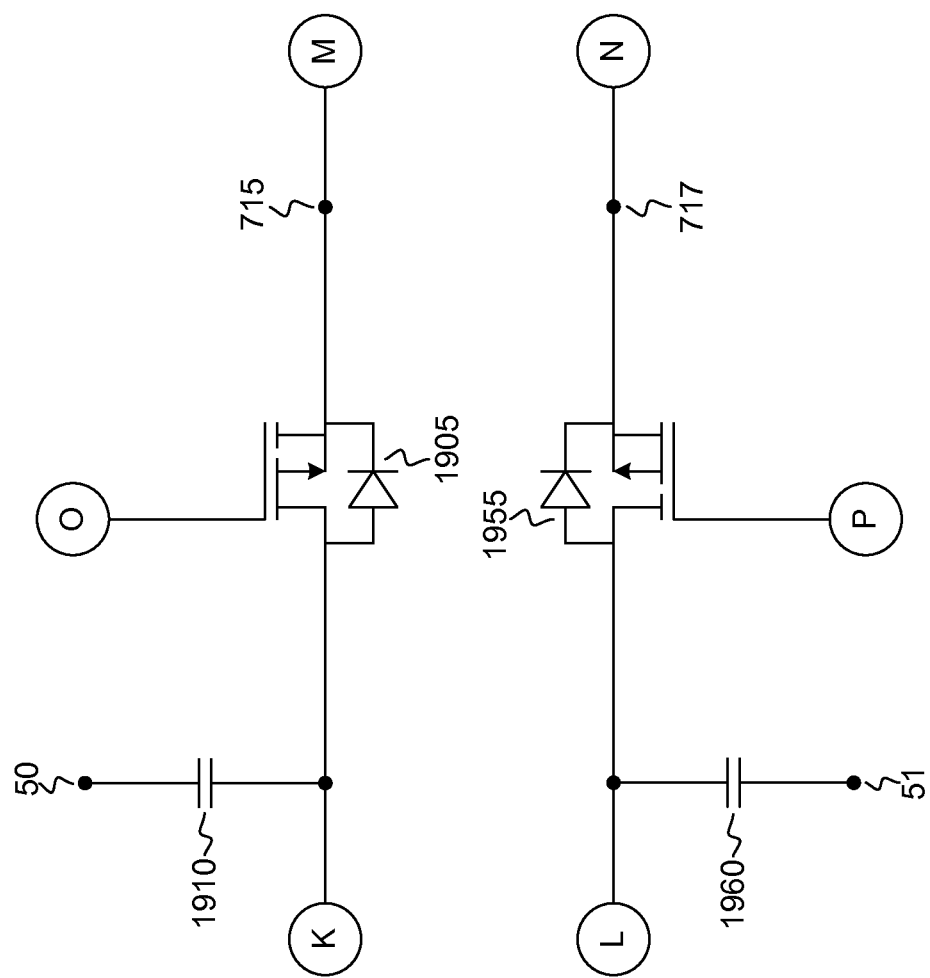

FIGS. 11a-11b illustrate another embodiment of the present invention for a dual array charge pump having a plurality of subcircuit N's. Stages of subcircuit N's are placed from left to right. The subcircuit N 1160 is the right-most stage. A voltage VB1 at node 981 connected to the PS1 port of subcircuit N 1160 and a voltage VB2 at node 983 connected to the PS2 port of subcircuit N 1160. The VB1 and VB2 voltages can both be output voltages or input voltages depending upon the type of charge pump operation, i.e., a negative charge pump or a positive charge pump.

The D1 and D2 ports of the subcircuit 1160 remain unconnected. Its CLKB port is connected to clock signal 51 and its CLKA port is connected to clock signal 50. The gating port PG1 of subcircuit N 1160 is connected to the D1 port of subcircuit N 1150, while the gating port PG2 of subcircuit N 1160 is connected to the D2 port of the subcircuit N 1150. The PS1 port of subcircuit N 1150 connects directly to the NS1 port of subcircuit N 1160, while the PS2 port of subcircuit N 1150 connects directly to the NS2 port of subcircuit N 1160.

The subcircuit N 1150 receives clock signal 50 at its CLKB port and clock signal 51 at its CLKA port. This pattern is repeating such that the gating ports PG1 and PG2 of subcircuit N 1150 are connected to the D1 and D2 ports, respectively, of a subcircuit N 1148, while the NS1 and NS2 ports of subcircuit N 1150 connect to the PS1 and PS2 ports, respectively, of subcircuit N 1148.

Based upon simulation or calculation, the number of stages of subcircuit N's can be set to meet specific design requirements. A person have ordinary skill in the circuit design field can understand the repeating pattern and how clock signals 50 and 51 are applied such that if one stage of subcircuit N receives clock signal 50 at the CLKA port, then the next successive stage of subcircuit N must receive clock signal 51 at the CLKA port. Thus, the subcircuit N 1148 must receive clock signal 51 at the CLKB port and clock signal 50 at the CLKA port.

The ports PG1, PG2, NS1, and NS2, of subcircuit N 1148 can be connected to subcircuit N 1140. The PG1 and PG2 ports of subcircuit N 1148 connect to the D1 and D2 ports, respectively, of subcircuit N 1140. The previous NS1 and NS2 ports connect directly to the PS1 and PS2 ports, respectively, of subcircuit N 1140. The subcircuit N 1140 receives clock signals 50 and 51 at its CLKB and CLKA ports, respectively, by the repeating requirements.

This stage is the left-most or initial stage of the dual array cascade, and two PMOS transistors 1905 and 1955 can also be connected to complete the charge pump. The NS1 node of subcircuit N 1140 connects to the source of the PMOS transistor 1905. It is understood that the source of the PMOS transistor 1905 is also connected to its body. Alternatively, the transistors in the charge pump can have their respective bodies connected to a fixed global body potential (e.g., a fixed voltage). It should also be understood that isolation nodes or isolation techniques are not drawn but is well known to a person having ordinary skill in the art.

The drain of the PMOS transistor 1905 is connected both to the PG1 port of subcircuit N 1140 and to one port of capacitor 1910. The gate of the PMOS transistor 1905 gate is connected to the D1 port of subcircuit N 1140. The other port of capacitor 1910 is connected to the clock 50 with the understanding that the CLKA port of subcircuit N 1140 and the capacitor 1910 must not receive the same clock signal.

The NS2 node of subcircuit N 1140 connects to the source of PMOS transistor 1955. It is understood that the source of PMOS 1955 is also connected to its body. Alternatively, the transistors in the charge pump can have their respective bodies connected to a fixed global body potential (e.g., a fixed voltage). It should also be understood that isolation nodes or isolation techniques are not drawn but is known to a person having ordinary skill in integrated circuit design. The drain of PMOS transistor 1955 is connected both to the PG2 port of subcircuit N 1140 and to one port of capacitor 1960. The gate of PMOS transistor 1955 is connected to the D2 port of subcircuit N 1140. The other port of capacitor 1960 is connected to the clock 51 with the understanding that the CLKB port of subcircuit N 1140 and the capacitor 1960 must not receive the same clock signal.

Voltages VA1 at node 715 and VA2 at node 717 are connected to the NS1 and NS2 ports, respectively, of subcircuit N 1140. The voltages VA1 and VA2 can both be output voltages or input voltages depending upon the type of charge pump operation, i.e., a negative charge pump or a positive charge pump.

Figure 12:
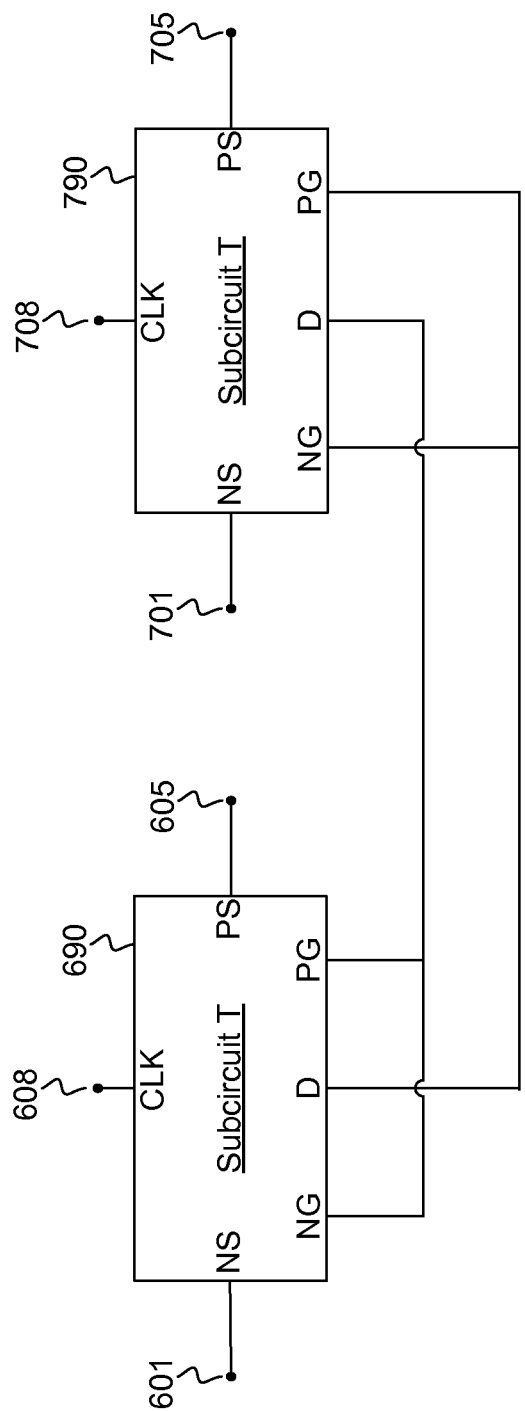
FIG. 12 illustrates an interconnection of two subcircuit T's to form a block circuit, herein referred to as subcircuit H.

FIG. 12 illustrates an interconnection of two subcircuit T's to form a block circuit, herein referred to as subcircuit H. The ports of subcircuit T 690 are referenced as follows: the NS port is given port reference NS1 at node 601; the PS port is given port reference PS1 at node 605; and the CLK port is given port reference CLKA at node 608. The ports of subcircuit T 790 are referenced as follows: the NS port is given port reference NS2 at node 701; the PS port is given port reference PS2 at node 705; and the CLK port is given port reference CLKB at node 708. The NG port and PG port of subcircuit T 690 both connect directly to the D port of subcircuit T 790. Similarly, the NG port and PG port of subcircuit T 790 both connect directly to the D port of subcircuit T 690.

Figure 13:
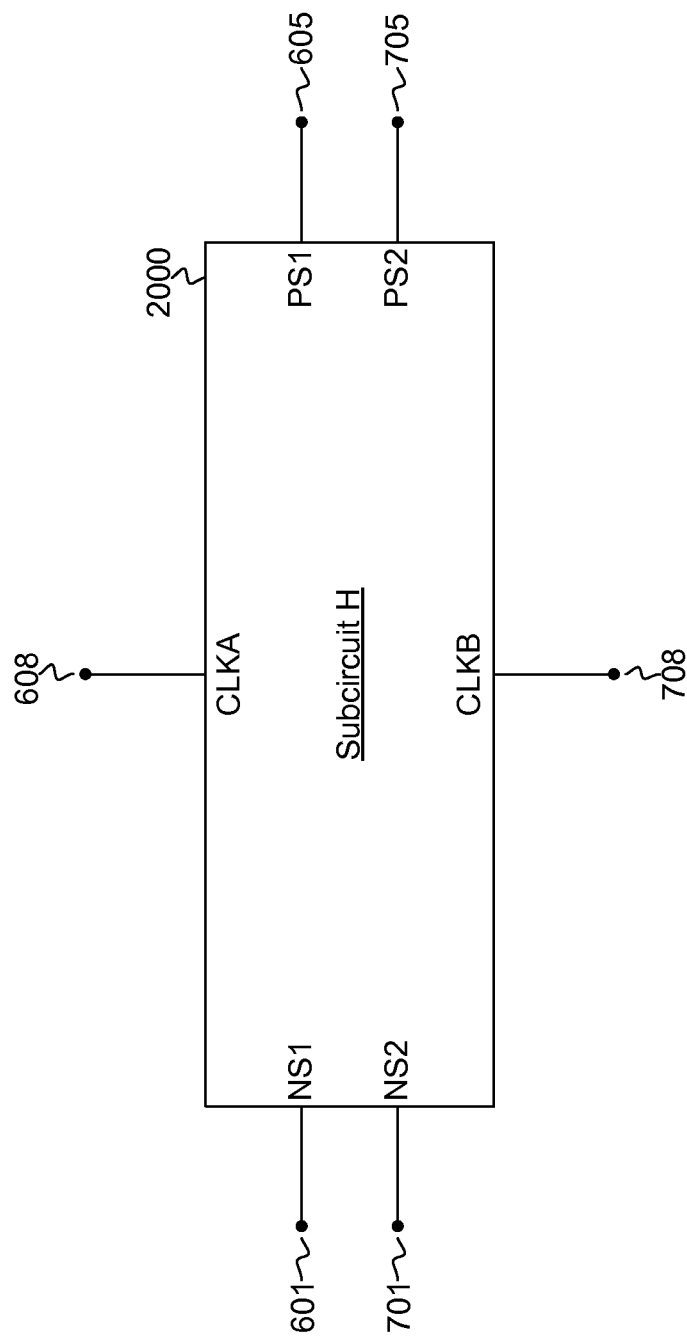
FIG. 13 illustrates a hierarchical block representation of a subcircuit H.

FIG. 13 illustrates a hierarchical block representation of a subcircuit H. The hierarchical block representation of a subcircuit H 2000 is equivalent to the circuit diagram in FIG. 12. The ports of subcircuit H 2000 correspond to the ports referenced in FIG. 12 and are summarized as follows: the clock signal ports are CLKA and CLKB; the left NMOS source ports are NS1 and NS2; and the right PMOS source ports are PS1 and PS2. The hierarchical block can be used in generating hierarchical schematics. Additionally, it would be understood that additional layout requirements, such as isolation wells with their respective isolation node connections, are global. Isolation nodes and methodologies are not drawn in this symbol since such nodes and methodologies are commonly known by a person having ordinary skill in the art, in particular for those who follow commonly practiced integrated circuit design techniques.

There is a rule in connecting the CLKA and the CLKB ports: the CLKA port and the CLKB port must receive opposite-phased (or out-of-phase) clocks. This means that if the designer uses clock signals 50 and 51 and the CLKA port receives the clocks signal 50, then the CLKB port must receive clock signal 51. Alternatively, if the CLKA port receives clock signal 51, then CLKB 708 must receive clock signal 50.

Figure 14:
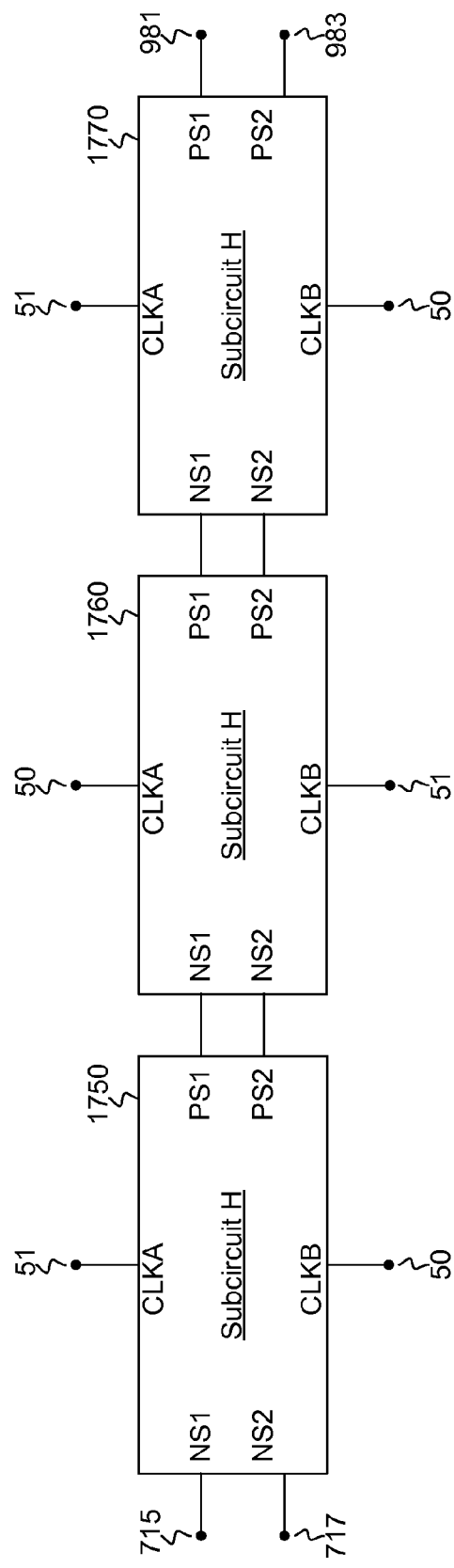
FIG. 14 illustrates another embodiment of the present invention for a dual array charge pump having multiple subcircuit H's.

FIG. 14 illustrates another embodiment of the present invention for a dual array charge pump using an array of subcircuit H's. There are three stages of the subcircuit H illustrated from left to right. The first stage subcircuit H 1750 is the left-most stage. A voltage VA1 at node 715 connected to the NS1 port of the subcircuit H 1750 and a voltage VA2 717 connected to its NS2 port. The voltages VA1 and VA2 can both be output voltages or input voltages depending upon the type of charge pump operation, i.e., a negative charge pump or a positive charge pump. The third stage subcircuit H 1770 is the right-most stage.

A voltage VB1 at node 981 is connected to the PS1 port of subcircuit H and a voltage VB2 at node 983 is connected to the PS2 port of subcircuit H. The voltages VB1 and VB2 can both be output voltages or input voltages depending upon the type of charge pump operation, i.e., a negative charge pump or a positive charge pump. It is noted that if the voltages VA1 and VA2 are inputs, then voltages VB1 and VB2 are outputs. Similarly, if the voltages VA1 and VA2 are outputs, then voltages VB1 and VB2 are inputs.

A subcircuit H 1760 is an intermediate stage in an array of subcircuit H's. The stages are connected by connecting the NS1 port of a subcircuit H with the PS1 port of a next subcircuit H and connecting the NS2 port of the subcircuit H with the PS2 port of the next subcircuit H (illustrated in FIG. 14). Any number of intermediate stages (including not having an intermediate stage) can be selected based on the charge pump requirements as determined by simulation, calculation, or other design specifications.

The rule for connecting clock signals 51 and 52 to the subcircuits is that they must alternate in the array. In other words, if one subcircuit H receives clock signal 50 at the respective CLKA port, then the adjacent subcircuit H must receive clock signal 51 at its respective CLKA port. Furthermore, the CLKA and CLKB ports of a subcircuit H must receive opposite-phased clocks. For instance, if the CLKA port of the subcircuit H receives clock signal 51, then the respective CLKB port of that subcircuit H must receive clock signal 50, and vice versa.

With respect to the operation of the various embodiments of the present invention for a charge pump, several circuit approaches for cascading single or dual arrays comprised of subcircuit T's were presented above. In order to further understand how to operate and how to construct such low input voltage charge pumps, the fundamental subcircuit T structure illustrated in FIGS. 2a-2b is of great importance. Referring to FIGS. 2a-2b, the qualitative theory of charge pump operation is as follows. First, during the transient when the clock signal applied at node 108 transitions from high to low, there can be conventional current flow from the NS port at node 101 to the D port at node 103 through the NMOS transistor 106. This represents a positive charge flow from left to right onto the pump capacitor C 107 at the D port 103; ideally, there would be no loss.

Also, ideally there is no conventional current flow from right to left through either transistors 106 and 109. Second, during the transient when the clock signal applied at CLK 108 transitions from low to high, there can be conventional current flow from the D port at node 103 to the PS port at node 105 through the PMOS transistor 109. This represents positive charge flow from left to right off of the pump capacitor C 107 and through the PMOS transistor 109.

Again, ideally there would be no loss. However, in practice, there are sources of loss. In reality there is loss to the following: to the parasitic elements, to the voltage drop of the NMOS transistor 106 when it conducts current (e.g., conduction from left to right), to the voltage drop of the PMOS transistor 109 when it conducts current (e.g., conduction from left to right), to the reverse current through the PMOS transistor 109 when it blocks current (e.g., blocking from right to left), and to the reverse current through the NMOS 106 when it blocks current (e.g., blocking from right to left).

The circuit approaches of the present invention address ways to drive the gates NG at node 102 of NMOS 106 and PG at node 104 of PMOS 109 such that the charge transfer described above best approaches the ideal. The result is to transfer charge from left to right among the cascaded stages such that the voltage increases along the array from left to right. Moreover, the gates NG at node 102 and PG at node 104 are connected in order to allow third quadrant or close to third quadrant conduction in the NMOS transistor 106 and PMOS transistor 109. The idea of third quadrant conduction in an NMOS or PMOS transistor is commonly understood by a person having ordinary skill in the integrated circuit design field.

The first approach illustrated in FIGS. 3a-3b is one method to connect a charge pump array to create a large magnitude negative voltage or large magnitude positive voltage from a smaller input voltage of magnitude, Vin. Suitable clock waveforms are illustrated in FIG. 4. To create a positive charge pump, the charge pump output can be connected at node 400 having the voltage VB. The voltage VB at node 400 can be connected to an electrical load (not illustrated). In order to reduce ripples and to smooth the output waveform of the voltage VA at node 400, an output capacitor can also be connected.

In creating the positive charge pump, the voltage VA at node 25 can be connected to a fixed voltage potential of value between 0 and Vin, i.e., the supplied input voltage. The selection in this case of the fixed voltage potential for VA at node 25 can be selected based on a design procedure. It is noted that the electrical load can mean any type of circuit element or series of circuit elements requiring a voltage source.

Alternatively, to create a negative charge pump using the approach of FIGS. 3a-3b, the charge pump output can be connected at node 25 having the voltage VA. The voltage VA at node 25 can connect to an electrical load (not drawn). In order to reduce ripples and to smooth the output waveform for the voltage VA at node 25, an output capacitor can also be connected. In creating the negative charge pump, the voltage VB at node 400 can be connected to a fixed voltage potential of value between 0 and Vin, i.e., the supplied input voltage. The selection in this case of the fixed potential VB at node 400 can be based on the circuit design procedure. It is noted that typically the voltage VB at node 400 would be connected to ground (e.g., 0 Volt) in creating a negative charge pump.

The second approach illustrated in FIGS. 5a-5b is another method to connect a charge pump array to create a large magnitude negative voltage or large magnitude positive voltage from a smaller input voltage of magnitude, Vin. Suitable clock waveforms are shown in FIG. 4. To create a positive charge pump the charge pump output can be connected at the voltage VB at node 400. The voltage VB at node 400 can be connected to an electrical load (not drawn). In order to reduce ripples and to smooth the output waveform for the voltage VB at node 400, a large output capacitor may also be connected. In creating the positive charge pump, the voltage VA at node 25 can be connected to a fixed voltage potential of value between 0 and Vin, the supplied input voltage. The selection in this case of the fixed potential VA at node 25 can be part of the circuit design procedure.

Alternatively, to create a negative charge pump using the approach of FIGS. 5a-5b, the charge pump output can be connected at node 25 having the voltage VA. The voltage VA at node 25 can be connected to an electrical load (not drawn). In order to reduce ripples and to smooth the output waveform for the voltage VA at node 25, a large output capacitor may also be connected. In creating the negative charge pump, the voltage VB at node 400 is connected to a fixed voltage potential of value between 0 and Vin, the supplied input voltage. The selection in this case of the fixed potential VB at node 400 can be part of the circuit design procedure. It is noted that typically VB is connected to ground (i.e., 0 Volt) in creating a negative charge pump.

The third approach of FIGS. 8a-8b is a method to connect dual charge pump arrays to create large magnitude negative voltages or large magnitude positive voltages from a smaller input voltage of magnitude, Vin. Suitable clock waveforms to drive the charge pump are shown in FIG. 4. In the dual array approach, ideally charge can flow from left to right along two independent branches: one branch (array) is defined from VA1 at node 715 to VB1 at node 981; and another branch (array) is defined from VA2 at node 717 to VB2 at node 983. Also, in the dual array approach under certain design conditions, VB1 at node 981 and VB2 at node 983 could be designed to be independent connections. Similarly, VA1 at node 715 and VA2 at node 717 could be designed to be independent connections.

In designing a positive charge pump, the charge pump output can be connected at node 981 having the voltage VB1 and node 983 having the voltage VB2. The voltage VB1 at node 981 can be connected to an electrical load and output capacitor (not drawn), and the voltage VB2 at node 983 can be connected to an electrical load and output capacitor (not drawn). It is possible under certain design conditions to leave the voltages VB1 at node 981 and VB2 at node 983 separate (i.e., not connected to each other). However, the simplest design approach is to connect VB1 at node 981 and VB2 at node 983 together to form a single positive charge pump output.

Also, in designing a positive charge pump, the voltages VA1 at node 715 and VA2 at node 717 can be fixed voltages. The voltages VA1 at node 715 can be connected to a fixed voltage between 0 and Vin. Similarly, VA2 at node 717 can be connected to a fixed voltage between 0 and Vin. It is possible under certain design conditions to leave VA1 at node 715 and VA2 at node 717 separate (i.e., not connected to each other). However, the simplest design approach is to connect VA1 at node 715 and VA2 at node 717 together to the same potential.

In designing a negative charge pump, the charge pump output can be connected at node 715 having the voltage potential VA1 and at node 717 having the voltage potential VA2. The voltage potential VA1 at node 715 can be connected to an electrical load and output capacitor (not drawn), and the voltage potential VA2 at node 717 can be connected to an electrical load and output capacitor (not drawn). It is possible under certain design conditions to leave the voltages VA1 at node 715 and VA2 at node 717 separate, i.e., unconnected from each other. However, the simplest design approach is to connect the voltages VA1 at node 715 and VA2 717 together to form a single negative charge pump output.

Also, in designing a negative charge pump, the voltages VB1 at node 981 and VB2 at node 983 can be connected to fixed voltages. The voltage VB1 at node 981 can be connected to a fixed voltage between 0 and Vin. Similarly, the voltage VB2 at node 983 can be connected to a fixed voltage between 0 and Vin. It is possible under certain design conditions to leave the voltages VB1 at node 981 and VB2 at node 983 separate (i.e., not connected to each other). However, the simplest design approach is to connect the voltages VB1 at node 981 and VB2 at node 983 together to the same potential.

The fourth approach of FIGS. 11a-11b is a method to connect a dual array charge pump to create large magnitude negative voltages or large positive voltages from a smaller input voltage of magnitude, Vin. Suitable clock waveforms are illustrated in FIG. 4 to drive the dual array charge pump. In designing a positive charge pump, the charge pump output can be connected at the voltages VB1 at node 981 and VB2 at node 983. The voltage VB1 at node 981 can be connected to an electrical load and output capacitor (not drawn), and the voltage VB2 at node 983 can be connected to an electrical load and output capacitor (not drawn). It is possible under certain design conditions to leave the voltages VB1 at node 981 and VB2 at node 983 separate (i.e., not connected to each other). However, the simplest design approach is to connect the voltages VB1 at node 981 and VB2 at node 983 together to form a single positive charge pump output.

Also, in designing a positive charge pump, the voltages VA1 at node 715 and VA2 at node 717 can be connected to fixed voltages. The voltage VA1 at node 715 can be connected to a fixed voltage between 0 and Vin. Similarly, the voltage VA2 at node 717 can be connected to a fixed voltage between 0 and Vin. It is possible under certain design conditions to leave the voltages VA1 at node 715 and VA2 at node 717 separate (i.e., not connected to each other). However, the simplest design approach is to connect the voltages VA1 at node 715 and VA2 at node 717 together to the same potential.

In designing a negative charge pump, the charge pump output can be connected at nodes 715 having the potential VA1 and 717 having the potential VA2. The voltage VA1 at node 715 can be connected to an electrical load and output capacitor (not drawn), and the voltage VA2 at node 717 can be connected to an electrical load and output capacitor (not drawn). It is possible under certain design conditions to leave the voltages VA1 at node 715 and VA2 at node 717 separate (i.e., not connected with each other). However, the simplest design approach is to connect the voltages VA1 at node 715 and VA2 at node 717 together to form a single negative charge pump output.

Also, in designing a negative charge pump, the voltages VB1 at node 981 and VB2 at node 983 can be connected to fixed voltages. The voltage VB1 at node 981 can be connected to a fixed voltage between 0 and Vin. Similarly, VB2 at node 983 can be connected to a fixed voltage between 0 and Vin. It is possible under certain design conditions to leave VB1 at node 981 and VB2 at node 983 separate (i.e., not connected to each other). However, the simplest design approach is to connect the voltages VB1 at node 981 and VB2 at node 983 together to the same potential.

The fifth approach illustrated by FIG. 14 is a method to connect dual charge pump arrays to create large magnitude negative voltages or large positive voltages from a smaller input voltage of magnitude, Vin. Suitable clock waveforms are shown in FIG. 4 to drive the charge pump. In designing a positive charge pump, the charge pump output can be connected at the voltages VB1 at node 981 and VB2 at node 983. The voltage VB1 at node 981 can be connected to an electrical load and an output capacitor (not drawn), and VB2 at node 983 can be connected to an electrical load and an output capacitor (not drawn). It is possible under certain design conditions to leave the voltages VB1 at node 981 and VB2 at node 983 separate (i.e., not connected with each other). However, the simplest design approach is to connect the voltages VB1 at node 981 and VB2 at node 983 together to form a single positive charge pump output.

Also, in designing a positive charge pump, the voltages VA1 at node 715 and VA2 at node 717 are connected to fixed voltages. The voltage VA1 at node 715 can be connected to a fixed voltage between 0 and Vin. Similarly, the voltage VA2 at node 717 can be connected to a fixed voltage between 0 and Vin. It is possible under certain design conditions to leave the voltages VA1 at node 715 and VA2 at node 717 separate (i.e., not connected with each other). However, the simplest design approach is to connect the voltages VA1 at node 715 and VA2 at node 717 together to the same potential.

In designing a negative charge pump, the charge pump output can be connected at the voltages VA1 at node 715 and VA2 at node 717. The voltage VA1 at node 715 can be connected to an electrical load and output capacitor (not drawn), and VA2 at node 717 can be connected to an electrical load and an output capacitor (not drawn). It is possible under certain design conditions to leave the voltages VA1 at node 715 and VA2 at node 717 separate (i.e., not connected to each other). However, the simplest design approach is to connect the voltages VA1 at node 715 and VA2 at node 717 together to form a single negative charge pump output.

Also, in designing a negative charge pump, the voltages VB1 at node 981 and VB2 at node 983 can be connected to fixed voltages. The voltage VB1 at node 981 can be connected to a fixed voltage between 0 and Vin. Similarly, the voltage VB2 at node 983 can be connected to a fixed voltage between 0 and Vin. It is possible under certain design conditions to leave VB1 981 and VB2 983 separate (i.e., not connected to each other). However, the simplest design approach is to connect the voltages VB1 at node 981 and VB2 at node 983 together to the same potential.

In alternative embodiments of the present invention, the circuit approaches described above use a fundamental subcircuit T and duplicate the subcircuit T in creating or cascading single array or dual array charge pumps. It can be understood by a person having ordinary skill in the art that there are many permutations of the values and sizes of the fundamental components such as pump capacitors, NMOS transistors, and PMOS transistors used in the present invention. Thus, it is possible to derive an embodiment which uses the basic subcircuit T, but within each instance, the components have unique values.

By way of example, an NMOS transistor in one subcircuit T having a width equal to 300 um, while in another example, the width is equal to 400 um. Also, in another example, a pump capacitor may have a value of 10 pf in one subcircuit T, while in another subcircuit T, a pump capacitor may have a value of 100 pf. Furthermore, various permutations can be used within the same cascaded pump design. Thus, it is possible to design with many sizes. Therefore, it is to be understood that the various embodiments and permutations using the subcircuit T are intended to be covered by the present invention.

While the present invention has been described with reference to certain preferred embodiments or methods, it is to be understood that the present invention is not limited to such specific embodiments or methods. Rather, it is the inventor's contention that the invention be understood and construed in its broadest meaning as reflected by the following claims. Thus, these claims are to be understood as incorporating not only the preferred methods described herein but all those other and further alterations and modifications as would be apparent to those of ordinary skilled in the art.

I claim:

1. A charge pump circuit, comprising,
   a plurality of subcircuits, wherein each of the subcircuits comprising an X-source terminal, an X-gate terminal, a Y-gate terminal, a Y-source terminal, a common drain terminal, and a clock terminal;

wherein the X-gate terminal of a first subcircuit is connected to the common drain of a second subcircuit, the Y-gate terminal and Y-source terminal of the first subcircuit are connected to the X-source terminal of the second subcircuit; wherein there is a Va voltage at the X-source terminal of the first subcircuit and there is a Vb voltage at the Y-source terminal of the second subcircuit; and wherein each of the subcircuits comprises an X-channel device having the X-gate terminal, the X-source terminal and a X-drain terminal, a Y-channel device having the Y-gate terminal, the Y-source terminal and a Y-drain terminal, and a capacitor; wherein a first end of the capacitor, the X-drain terminal, and the Y-drain terminal are connected with each other to form the common drain terminal; and wherein a second end of the capacitor is the clock terminal.

2. The charge pump circuit of claim 1 wherein the Va voltage is at a fixed voltage.

3. The charge pump circuit of claim 1 wherein the Vb voltage is at a fixed voltage.

4. The charge pump circuit of claim 1 wherein the clock terminal of the first subcircuit receives a first clock phase and the clock terminal of the second subcircuit receives a second clock phase, and wherein the first clock phase and the second clock phase are out of phase.

5. The charge pump circuit of claim 1 wherein each of the X-channel devices is an N-channel device and each of the Y-channel devices is a P-channel device.

6. The charge pump circuit of claim 1 wherein each of the X-channel devices is a P-channel device and each of the Y-channel devices is an N-channel device.

7. The charge pump circuit of claim 1 further comprising a third X-channel device having an X-gate terminal, an X-source terminal, and an X-drain terminal, and a third capacitor;

wherein the X-source terminal of the third X-channel device is connected to the body of the third X-channel device;

wherein the Y-source terminal and the Y-gate terminal of the second subcircuit are connected to the X-source terminal of the third X-channel device, the common drain terminal of the second subcircuit is connected to the X-gate terminal of the third X-channel device, and the X-gate terminal of the second subcircuit and a first end of the third capacitor are connected to the third X-drain terminal; and wherein a second end of the third capacitor receives a clock phase that is out of phase with the clock phase received at the clock terminal of the second subcircuit.

8. The charge pump circuit of claim 1 wherein for each of the subcircuits, the X-source terminal is connected to the body of the X-channel device and the Y-source terminal is connected to the body of the Y-channel device.

9. The charge pump circuit of claim 1 wherein for each of the subcircuits, the respective body of the X-channel device is connected to a first fixed voltage and the respective body of the Y-channel device is connected to a second fixed voltage.

10. The charge pump circuit of claim 1 wherein for each of the subcircuits, the X-source terminal is connected to the body of the X-channel device and the Y-source terminal is connected to a fixed voltage.

11. The charge pump circuit, comprising,
a plurality of subcircuits;

wherein each of the subcircuits comprising a first X-source terminal, a second X-source terminal, a first common drain terminal, a second common drain terminal, a first X-gate terminal, a second X-gate terminal, a first clock terminal, a second clock terminal, a first Y-source terminal, and a second Y-source terminal;

wherein each of the subcircuits comprises,
a first X-channel device having the first X-gate terminal, the first X-source terminal and a first X-drain terminal,
a first Y-channel device having a first Y-gate terminal, the first Y-source terminal and a first Y-drain terminal,
a first capacitor,
a second X-channel device having the second X-gate terminal, the second X-source terminal and a second X-drain terminal,
a second Y-channel device having a second Y-gate terminal, the second Y-source terminal and a second Y-drain terminal, and
a second capacitor,
wherein a first end of the first capacitor, the first X-drain terminal and the first Y-drain terminal are connected to form the first common drain terminal,
wherein a second end of the first capacitor is the first clock terminal,
wherein a first end of the second capacitor, the second X-drain terminal and the second Y-drain terminal are connected to form the second common drain terminal,
wherein a second end of the second capacitor is the second clock terminal,
wherein the first common drain terminal is connected to the second Y-gate terminal of the second Y-channel device, and
wherein the second common drain terminal is connected to the first Y-gate terminal of the first Y-channel device;

wherein the first X-gate terminal of a first subcircuit is connected to the first common drain terminal of a second subcircuit;

wherein the second X-gate terminal of the first subcircuit is connected to the second common drain terminal of the second subcircuit;

wherein the first Y-source terminal of the first subcircuit is connected to the first X-source terminal of the second subcircuit;

wherein the second Y-source terminal of the first subcircuit is connected to the second X-source terminal of the second subcircuit; and wherein there is a Va1 voltage at the first X-source terminal of the first subcircuit, there is a Va2 voltage at the second X-source terminal of the first subcircuit, there is a Vb1 voltage at the first Y-source terminal of the second subcircuit, and there is a Vb2 voltage at the second Y-source terminal of the second subcircuit.

12. The charge pump circuit of claim 11 wherein the Va1 voltage and the Va2 voltage are at a fixed voltage.

13. The charge pump circuit of claim 11 wherein the Vb1 voltage and the Vb2 voltage are at a fixed voltage.

14. The charge pump circuit of claim 11 wherein the first clock terminal of the first subcircuit and the second clock terminal of the second subcircuit receive a first clock phase and the second clock terminal of the first subcircuit and the first clock terminal of the second subcircuit receive a second clock phase, and wherein the first clock phase and the second clock phase are out of phase.

15. The charge pump circuit of claim 11 wherein each of the X-channel devices is an N-channel device and each of the Y-channel devices is a P-channel device.

16. The charge pump circuit of claim 11 wherein each of the X-channel devices is a P-channel device and each of the Y-channel devices is an N-channel device.

17. The charge pump circuit of claim 11 further comprising,
- a third X-channel device having an X-gate terminal, an X-source terminal, and an X-drain terminal, and a third capacitor,
  - wherein the X-source terminal of the third X-channel device is connected to the body of the third X-channel device,
  - wherein the first Y-source terminal of the second subcircuit is connected to the X-source terminal of the third X-channel device, the first common drain terminal of the second subcircuit is connected to the X-gate terminal of the third X-channel device, and the first X-gate terminal of the second subcircuit and a first end of the third capacitor are connected to the X-drain terminal of the third X-channel device, and
  - wherein a second end of the third capacitor receives a clock phase that is out of phase with the clock phase received at the first clock terminal of the second subcircuit; and
- a fourth X-channel device having an X-gate terminal, an X-source terminal, and an X-drain terminal, and a fourth capacitor,
  - wherein the X-source terminal of the fourth X-channel device is connected to the body of the fourth X-channel device,
  - wherein the second Y-source terminal of the second subcircuit is connected to the X-source terminal of the fourth X-channel device, the second common drain terminal of the second subcircuit is connected to the X-gate terminal of the fourth X-channel device, and the second X-gate terminal of the second subcircuit and a first end of the fourth capacitor are connected to the X-drain terminal of the fourth X-channel device, and
  - wherein a second end of the fourth capacitor receives a clock phase that is out of phase with the clock phase received at the second clock terminal of the second subcircuit.

18. The charge pump circuit of claim 11 wherein for each of the subcircuits, the source terminals of the first X-channel device, the first Y-channel device, the second X-channel device, and the second Y-channel device are respectively connected to the body of its respective device.

19. The charge pump circuit of claim 11 wherein for each of the subcircuits, the respective bodies of the X-channel devices are connected to a first fixed voltage and the respective bodies of the Y-channel devices are connected to a second fixed voltage.

20. The charge pump circuit of claim 11 wherein for each of the subcircuits, the source terminals of the first X-channel device and the second X-channel device are respectively connected to the body of its respective device and the first Y-channel device and the second Y-channel device are connected to a fixed voltage.

* * * * *